June 4, 1968  R. L. SELSAM  3,386,339
HYDRAULIC AMPLIFIER
Filed June 7, 1965  3 Sheets-Sheet 1

INVENTOR.
ROGER L. SELSAM
BY *Samuel R. Genca*
ATTORNEY

June 4, 1968 R. L. SELSAM 3,386,339
HYDRAULIC AMPLIFIER
Filed June 7, 1965 3 Sheets-Sheet 3

INVENTOR.
ROGER L. SELSAM
BY Samuel R. Genca
ATTORNEY

10

United States Patent Office 3,386,339
Patented June 4, 1968

3,386,339
HYDRAULIC AMPLIFIER
Roger L. Selsam, Rochester, N.Y., assignor to General Dynamics Corporation, a corporation of Delaware
Filed June 7, 1965, Ser. No. 461,805
6 Claims. (Cl. 91—52)

ABSTRACT OF THE DISCLOSURE

A hydraulic amplifier is described having first and second movable valving elements. The first element is responsive to input signal motion for varying the flow area of a first orifice in communication with a second orifice whose flow area is determined by a longitudinal slot having a given width and the positions of the second element which opens the second orifice. The second element moves to vary the flow area of the slot in response to changes in the flow area of the first orifice, but with a greater change in displacement than is executed by the first element.

---

The present invention relates in general to a hydraulic system and more particularly to a hydraulic amplifier.

Although the present invention is suited for more general applications such as in an hydraulic-mechanical motion amplifier, it is particularly adapted for use in an hydraulic amplifier, by which is meant an hydraulic valve mechanism which controls fluid flow and/or pressure at a high power level in response to a low power level input signal. Various types of hydraulic amplifiers are well known to those skilled in the art. Among some of the well known hydraulic amplifiers are servo valve mechanisms, which may include an electromechanical means for deriving a mechanical input motion to drive a valving member in the mechanism in response to an electrical input signal.

One of the major problems of long standing in the field of hydraulic amplifiers is that of obtaining a mechanical input motion to the valving member of sufficient amplitude in response to a low level electrical signal input to derive a desired hydraulic energy output, particularly for high frequency inputs. This is particularly critical in vibration exciters, underwater detection and communication equipment.

In the past, attempts have been made to increase the hydraulic energy output of the servo valve mechanism by adding more stages, such as cascading stages, by increasing the size of the electrical driver or electromechanical means and by increasing the input electrical signal. Other attempts also include increasing the supply pressure and orifice area of the valving member. For practical reasons, it may not always be possible to increase the supply pressure, the size of the electrical driver and the available input electrical signal due to space, weight or available electrical power. This may be true, particularly for underwater transducers employed at remote or inaccessible places.

One of the problems in simply cascading stages of hydraulic amplifiers is that each stage tends to be an integrator: i.e. a small fixed displacement of one spool in an input stage tends to create a velocity change in a following stage. This problem is normally solved by first making the input stage "open center" so that its output is a pressure rather than a flow and secondly restraining an output spool of the following stage with springs which convert this pressure (or force) to an output spool displacement. This technique has the disadvantages of being inefficient and "open loop," which cause it to be inherently not precise and sensitive to forces on the output spool.

Other techniques include mechanical feedback through linkages or springs, or auxiliary centering means, both of which have the disadvantage of adding complexity to the device. While still other techniques amplify the force level but not the stroke of the input spool and have the disadvantage of requiring very precise machining and manufacturing of both spools in the hydraulic amplifier.

The present invention has the feature of enhancing and increasing the hydraulic energy output of an improved hydraulic amplifier by amplifying the input motion produced in response to the electrical input signal by hydraulic means. A further feature of the invention is to provide means for amplifying the force level of the input motion.

The present invention solves a long-standing problem in the field of fluid control and hydraulic amplifiers by providing motion and force amplification in a closed loop manner without precision electrical elements or precision mechanical linkages.

It is a specific object of the present invention to provide an improved hydraulic amplifier.

It is another object of the present invention to provide an improved hydraulic amplifier for controlling the flow of hydraulic fluid very quickly with a relatively small actuating force.

It is still another object of the present invention to provide an hydraulic amplifier for applying a large force and large linear output motion in response to a small input motion at a low force level.

It is a further object of the present invention to provide an improved hydraulic amplifier for mechanical motion and hydraulic amplification in response to a low level electrical input signal.

It is still a further object of the present invention to provide an improved hydraulic amplifier having increased amplification capability and closer frequency control of a utilization device, such as a transducer or hydroacoustic generator without increasing the available electrical input signal or power to the amplifier.

It is yet another object of the present invention to provide an improved hydraulic amplifier which is responsive to a pulse signal of short duration to control the flow of a high pressure fluid.

It is still another object of the present invention to provide an improved hydraulic amplifier which is compact, simple in construction, and inexpensive to manufacture.

It is another object of the present invention to provide a system which amplifies mechanical motion and force hydraulically.

The present invention accomplishes the above objects and other objects by providing an improved and novel hydraulic amplifier. In accordance with one embodiment thereof, the hydraulic amplifier includes a first valving means connected to a source of fluid under pressure and a second valving means connected in series with the first valving means so that the same quantity of fluid flows through the first and second valving means.

The first valving means may be of the type which produces a relatively large change in fluid pressure in response to a small mechanical input motion which may be derived, for example, from an electrodynamic driver. The first valving means includes a valve body having a circular port and a cylindrical spool coating with the circular port to define a circular orifice having a flow area determined by its circumference ($\pi d$), where $d$ is the diameter of the port. The orifice has a length which varies in accordance with the displacement of the spool.

The second valving means has the feature of both controlling fluid pressure therethrough and deriving useful work in the process. More specifically, the second valving means includes a valve body having a cylindrical bore communicating with the first valving means at one end thereof and a longitudinal slot or slots of a given width ($w$) disposed along one of the longitudinal axes of the cylindrical bore for the flow of fluid therethrough.

The second valving means further includes a piston disposed within the bore and slidable over the slot to define a slotted orifice whose width ($w$) is fixed and whose length varies as the piston is displaced. The circumference ($\pi d$) of the circular orifice and the width ($w$) of the slotted orifice are in a direct ratio ($\pi d/w$) which is greater than one. The piston is free floating in the sense that it is responsive to fluid pressure within the one end of the cylindrical bore for linear movement.

Further included are means coupled to the piston for yieldingly urging the piston to a rest position when the pressure in the one end of the bore is at a given reference pressure. The given reference pressure may be, for example, one half of the fluid pressure supplied by the source, which reference pressure may be achieved when the flow area of the circular orifice substantially equals the flow area of the slotted orifice.

In the operation of the hydraulic amplifier, the spool in the first valving means and piston in the second valving means may be at rest position wherein the area of the slotted orifice substantially equals the area of the circular orifice. This area relationship of the slotted and circular orifices establishes the reference pressure within the one end of the cylindrical bore. The piston will remain at rest unless the reference pressure in the one end of the bore is changed. The reference pressure may be changed selectively by a displacement of the spool. For example, if the spool is instantaneously displaced a given amount to increase the flow area of the circular orifice, this displacement is accompanied by an increase in pressure within the one end of the cylindrical bore. The increased pressure within the one end of the cylindrical bore displaces the piston in the second valving means until the area of the slotted orifice once again substantially equals the area of the circular orifice and the reference pressure is restored in the one end of the bore. Since the ratio $\pi d/w$ of the circumference ($\pi d$) of the circular orifice to the width ($w$) of the slotted orifice is greater than one, the displacement of the piston is greater than the displacement of the spool and thus hydraulic amplification is achieved. Stated in another way, since the rate of fluid pressure change per unit of piston displacement in the second valving means is less than the rate of fluid pressure change per unit of spool displacement in the first valving means, the piston must be displaced a greater amount for the same change in fluid pressure effectuated by the displacement of the spool.

The invention itself, both as to its organization and operation, as well as additional objects and advantages thereof, will become more readily apparent from a reading of the following description in connection with the accompanying drawings in which:

Figure 1:
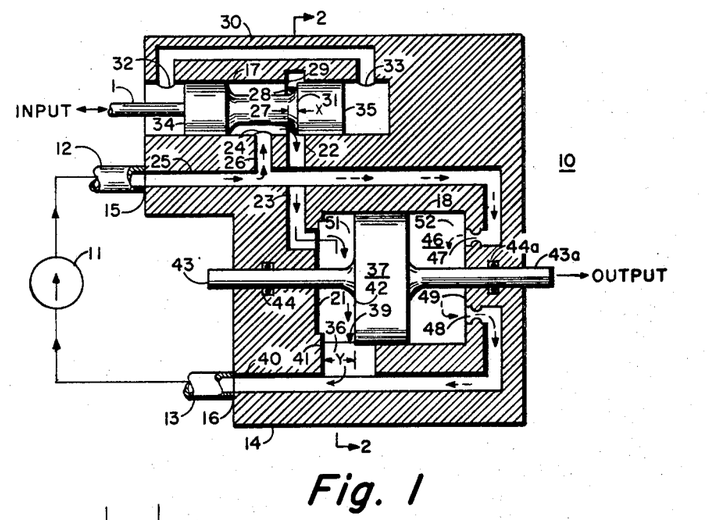
FIG. 1 is a central cross-sectional view of a hydraulic amplifier in accordance with the invention.
Figure 2:
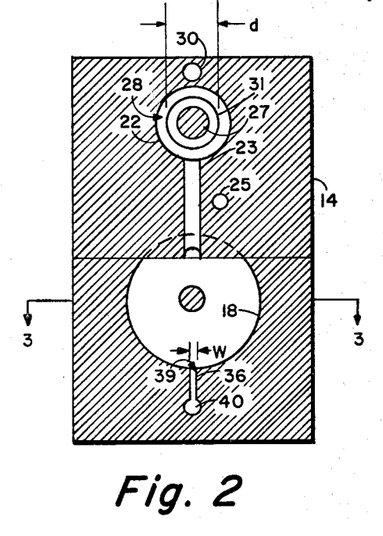
FIG. 2 is a cross-sectional view of the hydraulic amplifier of FIG. 1, taken along a plane normal to plane of the view shown in FIG. 1 along line 2—2.

Referring now to FIGS. 1–3, and more particularly to FIG. 1, an hydraulic amplifier 10 is shown connected to a source of fluid under pressure, such as provided by a pump 11, by way of an outlet line 12 and a return line 13. The hydraulic amplifier 10 of the invention is shown enclosed in a housing 14, having an inlet connection 15 connected to the outlet line 12 and a return connection 16 connected to the return line 13 of the pump 11. Within the housing 14 are a cylindrical channel 17 and a cylindrical cavity or bore 18 interconnected at one end 21 to the channel 17 at 22 by a fluid passage 23. The channel 17 has an inlet port 24 which is in communication with the outlet line 12 of the pump 11 by way of a main feed line 25 and a branch line 26. At 22 a circular porting structure is shown, having a diameter ($d$) which porting structure 22 is also illustrated in FIG. 2. A pilot spool 27 is shown slidably mounted within the channel 17 and positioned in cooperative relationship with the circular porting structure 22 to define a circular orifice 28 whose flow area is a function of the linear displacement of the pilot spool 27. The flow area, $A_1$ of the circular orifice 28 may be determined by an equation as follows:

$$A_1 = (\pi d)x \quad (1)$$

where $d$ is the diameter of the circular porting structure 22, and $x$ is the separation distance between an edge 29 of the porting structure 22 and a rim 31 of the pilot spool 27.

The flow area, A, of the circular orifice 28 may be varied selectively by displacing the pilot spool 27 along the longitudinal axis of the channel 17, relative to the edge 29. The pilot spool 27 may be moved manually or it may be moved remotely, such as by an electrodynamic driver, not shown, by applying a linear force to a pusher rod 1 connected to the spool 27. In normal operation, the pilot spool 27 is positioned relative to the edge 29 such that fluid continually flows through the circular orifice 28. The pilot spool 27 coacting with the circular porting structure 22 regulates the pressure within the one end 21 of the cylindrical bore 18. The aforesaid structure including the spool 27, the circular porting structure 22 which together define the circular orifice 28 may be considered as a first valving means.

Balancing ports 32 and 33 interconnected by a passage 30 are provided in channel 17, which balancing ports 32 and 33 are spaced from opposite ends 34 and 35 of the pilot spool 27 respectively for equalizing fluid or air pressure which may occur on the opposite ends 34 and 35 of the pilot spool 27 when the spool 27 is displaced.

The hydraulic amplifier 10 further includes a second valving means in the cylindrical bore 18 and a piston 37 slidably disposed in the cylindrical bore 18.

Figure 3:
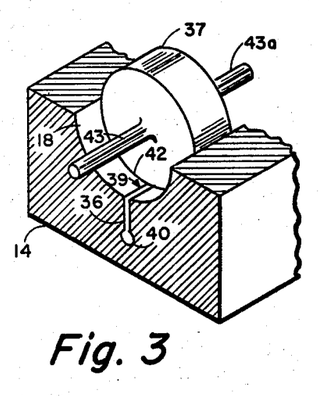
FIG. 3 is a fragmentary perspective view, in cross-section, of the hydraulic amplifier of FIG. 1, the section being taken along line 3—3 of FIG. 2 when looking in the direction of the arrows.

The cylindrical bore 18 includes a longitudinal slot 36 disposed along a longitudinal axis thereof (FIG. 3). The longitudinal slot 36 communicates with the return line 13 by way of a main return line 40 in the housing 14. The slot 36 has a given width ($w$) which is in a direct relationship with the circumference ($\pi d$) of the circular orifice 28 such that a ratio ($\pi d/w$) of the the circumference ($\pi d$) to the width ($w$) is greater than one in accordance with the invention. It should be pointed out that when the ratio ($\pi d/w$) is greater than one, hydraulic amplification may be achieved as will be described hereinafter.

The piston 37 is disposed within the cylindrical bore 18 and slidable over the slot 36 to define a slotted orifice 39 having a fixed width as determined by the width ($w$) of the slot 36 and a length (y) which varies as the piston 37 is displaced along the longitudinal axis of the cylindrical bore 18. The length of the slot 36 is slightly greater than the overall travel of the piston 37 considering of course that the piston 37 may be displaced on either side of a neutral point along the length of the slot 36. The flow area, $A_2$, of the slotted orifice 39 may be expressed by an equation as follows:

$$A_2 = wy \qquad (2)$$

where $w$ is the width of the slot 36 and $y$ is the length of the slotted orifice as measured from one end 41 of the slot 36 to a rim 42 of the piston 37. The length $y$ is an initial open position of the slotted orifice 39 and any displacement of the piston 37 may be considered as $\Delta y$. In the initial open position the piston 37 is at the neutral point along the length of the slot.

The piston divides the cylindrical bore 18 into two chambers, a first chamber 51 at one end 21 and a second chamber 52 at the other end 49 of the cylindrical bore 18.

The piston 37 is responsive to changes in fluid pressure in the one end 21 of the cylindrical bore 18 for linear movement whereby not only is the area or size of the slotted orifice affected by the displacement of the piston 37 but also useful work may be derived by the movement of the piston 37. Coupling rods or shafts 43 and 43a are fixed to the piston 37 for coupling the movement of piston to a load not shown. The coupling shafts 43 and 43a extend through shaft bores 44 and 44a in the housing 14. O rings 45 and 45a in the housing 14 provide a fluid seal around the coupling shafts 43 and 43a respectively.

It should be pointed out here that although a piston 37 is shown in the hydraulic amplifier 10, a secondary spool may be used instead to control the flow of a fluid under pressure to a utilization device as shown in more detail in a hydraulic amplifier 100 of FIG. 4 to be described hereinafter.

The hydraulic amplifier 10 further includes a biasing means 46 for biasing the piston 37 to a neutral or rest position. The piston 37 may be in a neutral or rest position when the fluid pressure in the first chamber 51 at the one end 21 of the cylindrical bore 18 is equal to the fluid pressure in the second chamber 52 at the other end 49 of the cylindrical bore 18.

The biasing means 46 includes inlet and outlet restrictions 47 and 48 disposed in the main feed line 25 and main return line 40 respectively which are connected to the other end 49 of the cylindrical bore 18 for deriving a reference pressure within the second chamber 52 at the other end 49 of the cylindrical bore 18. The reference pressure may, for example, be one half of the fluid pressure $P_s$ supplied by pump 11. The reference pressure $(P_{s/2})$ may be derived by making the flow areas of the inlet and outlet restrictions 47 and 48 substantially equal. When the inlet and outlet restrictions 47 and 48 are substantially equal, half supply pressure $(P_{s/2})$ exist in the other end 49 of the cylindrical bore 18. This relationship is somewhat analogous to an electrical voltage divider network comprising two resistors of substantially equal resistance connected between a source of voltage V and ground. The voltage which exists between ground and at a junction point between the two resistors will be one-half of the voltage supplied by the voltage source.

The biasing means 46 has been illustrated in FIG. 1 as a hydraulic means. It should be pointed out however that other means, such as a spring, not shown, may be used to bias the piston 37 to the rest position. The spring would supply the force to balance the force of the pressure on face and rim 42 of the piston 37.

The hydraulic amplifier 10 includes two hydraulic circuits within the housing 14. A first hydraulic circuit for the biasing means 46 for maintaining the reference pressure or half supply pressure $(P_{s/2})$ within the second chamber 52 at the other end 49 of the cylindrical bore 18. The first circuit may be traced from the pump 11 through the outlet line 12 to the main feed line 25 and through the inlet restriction 47 into the second chamber 52 at the other end 49 of the cylindrical bore 18. The first hydraulic circuit may be then traced from the chamber 52 at the other end 49 of the cylindrical bore 18 through the outlet restriction 48 to the main return line 40 and back to the pump 11 by way of return line 13. As was mentioned previously, one half of the fluid pressure supplied by the pump 11 exists within the other end of the cylindrical bore 18 due to the equal flow area of the inlet and outlet restrictions 47 and 48. Thus, if the pressure which exists within the chamber 51 at the one end 21 of the cylindrical bore 18 is less than or greater than the reference pressure in the chamber 52 at the other end 49 of the cylindrical bore 18, the piston will move in response to a pressure differential and will come to rest when the pressure within the first chamber at the one end 21 of the cylindrical bore 18 substantially equals the reference pressure in the second chamber at the other end 49 of the cylindrical bore 18 if there is no external load on the piston 37.

The other or main hydraulic circuit of the hydraulic amplifier 10 may be traced from the pump 11 through the outlet line 12 to the main feed line 25 through the branch line 26 to the channel 17. From the channel 17, the main hydraulic circuit may be further traced through the circular orifice 28 of the first valving means into the fluid passage 23 to the first chamber 51 at the one end 21 of the cylindrical bore 18. The other hydraulic circuit may be then traced from the first chamber 51 at the one end 21 of the cylindrical bore 18 through the slotted orifice 39 of the second valving means to the main return line 40 and back to the pump 11 by way of return line 13.

If piston 37 is stationary, the same quantity of fluid flows through the circular orifice 28 of the first valving means and the slotted orifice 39 of the second valving means since they are connected in series with each other between the main feed line 25 and the main return line 40. The circular orifice 28 may in response to a displacement of the pilot spool 27 vary the pressure within the first chamber 51 at the one end 21 of the cylindrical bore 18 from a negligible pressure or substantially zero pressure to substantially the pressure supplied $P_s$ by the pump 11, neglecting, of course, any pressure drop due to the friction within the inlet lines 12, the main feed line 25, branch line 26, the channel 17 and the like. The piston 37 in response to these changes in pressure will move, of course, in the direction of the greatest force or pressure until the pressures in the first and second chamber 51, 52 have been equalized as will be shown in the operation of the hydraulic amplifier 10.

In accordance with the invention, the main hydraulic circuit of the hydraulic amplifier 10 effectively defines a closed loop position servo circuit. This may be seen by considering a mathematical analysis of the main hydraulic circuit and the operation of the hydraulic amplifier 10. In the operation of the hydraulic amplifier 10, the piston 37 may initially be at a rest or neutral position at a neutral point along the length of the slot 36 when the fluid pressure in the first chamber 51 at the one end 21 of the cylindrical bore 18 equals the half supply pressure $P_{s/2}$ (or reference pressure) in the second chamber 52 in the other end 49 of the bore 18. The neutral point may be at a point midway along the length of the slot 36 but may be considered as a floating point as will be seen herein. The pressure in the second chamber 52 is at the reference or half supply pressure $(P_{s/2})$ as described previously. The fluid pressure in the first chamber 51 at one end 21 of the cylindrical bore 18 may be made to equal the reference pressure by initially positioning the pilot spool 27 and the piston 37 such that the flow area $A_1$ of the circular orifice 28 substantially equals the flow area $A_2$ of the slotted orifice 39. The equal areas $A_1$ and $A_2$ may be expressed as follows:

$$A_1 = A_2 \quad (3)$$

since $A_1 = (\pi d)x$ as defined by Equation 1 and $A_2 = wy$ as defined by Equation 2 by substitution $$(\pi d)x = wy \quad (4)$$

It should be noted that the hydraulic amplifier 10 operates on continual flow of fluid under pressure from the pump 11 through the first and main hydraulic circuit. Again considering instantaneous, stepwise operation, any slight movement ($\Delta x$) of the pilot spool 27 will effect the pressure in the chamber 51 at the one end 21 of the bore 18 and cause an amplified movement ($\Delta y$) of the piston 37 in accordance with the invention. The pilot spool 27, as was mentioned previously, may be displaced $\Delta x$ along the longitudinal axis of the channel 17 by an electrodynamic driver, not shown, to change the area of the circular orifice 28. The change in the area $A_1{}^1$ of the circular orifice 28 may be expressed as follows:

$$A_1{}^1 = (\pi d)x + (\pi d)\Delta x \quad (5)$$

It also follows that since the area $A_1{}^1$ of the circular orifice 28 is changed, a resultant change in pressure occurs in the first chamber 51 at the one end 21 of the cylindrical bore 18. Assuming that the flow area $A_1$ of the circular orifice is increased, the pressure in the one end 21 of the bore 18 will also increase and the piston 37 will be displaced in direction to increase the flow area $A_2$ of the slotted orifice 39 until the pressure in the first chamber 51 at the one end 21 of the cylindrical bore 18 drops to a value equal to the reference pressure in the second chamber in the other end 49 of the bore 18. The pressure in the first chamber 51 at the one end 21 of the bore 18 will drop until the flow areas of the circular orifice 28 substantially equals the flow area of the slotted orifice 39 and the half supply pressure ($P_{s/2}$) or reference pressure is established in the first chamber 51. As a result, the piston 37 has been displaced an amount $\Delta y$. The new area $A_2{}^1$ of the slotted orifice 39 may be expressed as follows:

$$A_2{}^1 = wy + w\Delta y \quad (6)$$

since the new areas $A_1{}^1$ and $A_2{}^1$ of the circular orifice 28 and the slotted orifice 39 are substantially equal, they may be expressed as follows:

$$(\pi d)x + (\pi d)\Delta x = wy + w\Delta y \quad (7)$$

since $\pi dx = wy$ as shown by Equation 4 they may be cancelled on both sides of the equation to derive a new equation as follows:

$$(\pi d)\Delta x = w\Delta y \quad (8)$$

The displacement of the piston 37 may be expressed as a function of the displacement of the pilot spool 27 in the following manner:

$$\Delta y = f(\Delta x) \quad (9)$$

or stated in another way:

$$\Delta y = \frac{\pi d}{w}(\Delta x) \quad (10)$$

It will be recalled that the ratio ($\pi d/w$) is greater than one so that the displacement $\Delta y$ of the piston 37 has been amplified by a factor ($\pi d/w$) each time the spool 27 is displaced by an amount $\Delta x$. Thus the ratio ($\pi d/w$) may be considered as being the amplification factor in accordance with the invention. Since the piston 37 is displaced by an increased or decreased pressure affected by the pilot spool 27 and it automatically adjusts the pressure within the first chamber 51 at one end 21 of the bore 18, the hydraulic amplifier 10 is considered to be effectively a closed loop position servo system.

It should be noted that the rate of fluid pressure change per unit of piston displacement for the slotted orifice 39 is less than the rate of fluid pressure change per unit of spool displacement of the circular orifice 28 so that the piston 37 must move a greater amount than the spool 27 to restore the reference or half supply pressure $P_{s/2}$ in the chamber 51.

A suitable amplification factor ($\pi d/w$) is three. However, other amplification factors may be selected without departing from the invention. It should also be pointed out that although only one slotted orifice has been utilized, a plurality of slotted orifices may be used, as will be shown in the embodiments shown in FIGS. 4 and 8 to be described hereinafter. A plurality of slotted orifices equally spaced around the piston 37 has the advantage of centering the piston 37 in the bore 18.

Figures 4, 6:
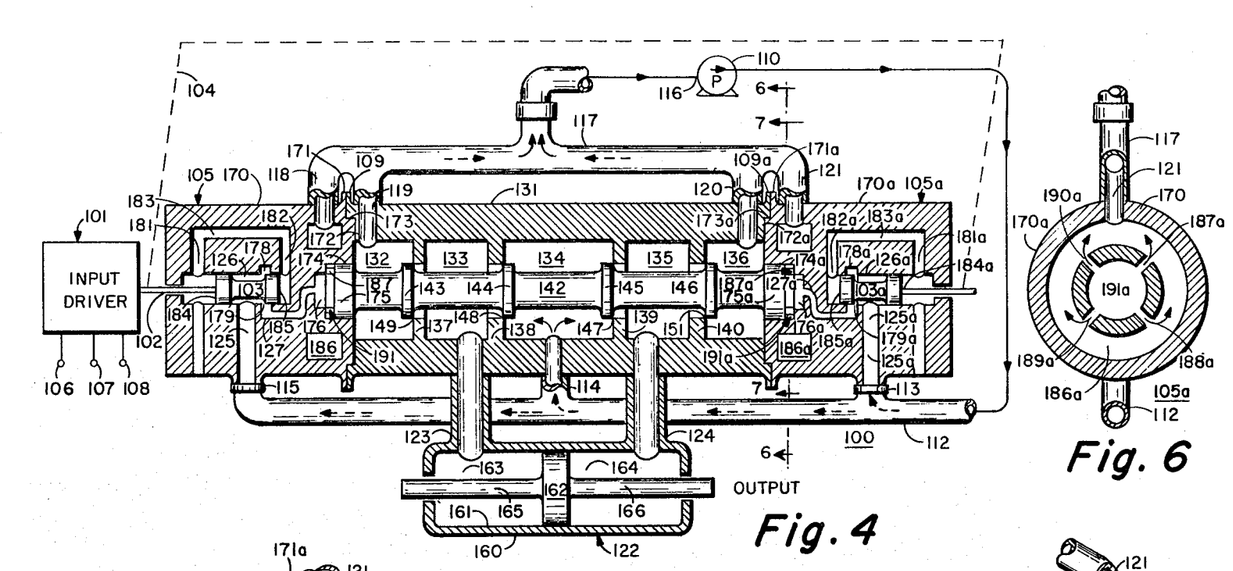
FIG. 4 is a central cross-sectional view of another hydraulic amplifier having push-pull stages in accordance with the invention.
FIG. 6 is a fragmentary, cross-sectional view of the hydraulic amplifier of FIG. 4, showing details of the hydraulic amplifier along line 6—6.

FIG. 4 shows another embodiment of the invention in a push-pull type hydraulic amplifier 100 which controls the flow of a fluid under pressure from a pump 110 to a utilization device such as a hydraulic ram 122. The hydraulic amplifier 100 differs from the hydraulic amplifier 10 of FIG. 1 in that an intermediate spool 142 is used instead of a piston 37. The intermediate spool 142 regulates the flow of fluid under pressure to the hydraulic ram 122. Another basic difference lies in the means for biasing the piston 37 of the intermediate spool 142 to a rest or neutral position. In the hydraulic amplifier 10 of FIG. 1, the piston 37 is biased to a neutral or rest position by a biasing means 46 which maintain a reference pressure, or half supply pressure $P_{s/2}$ in the chamber 52 at the other end 49 of the bore 18 (FIG. 1). In the hydraulic amplifier 100 of FIG. 4, the intermediate spool 142 is positively displaced by push-pull stages, each of which is substantially similar to the hydraulic amplifier 10 and will be described hereinafter.

One other distinction is in the number of slotted orifices included in the hydraulic amplifier 100. It will be recalled that the hydraulic amplifier 10 of FIG. 1 includes one slot 36 and one slotted orifice 39. The hydraulic amplifier 100 of FIG. 4 includes a plurality of slots which, together with the spool 142, defines a multi-slotted orifice which has an advantage of centering the intermediate spool 142 radially as will be described hereinafter.

Referring to FIGS. 4–7, and more particularly to FIG. 4, the hydraulic amplifier 100 is connected to the pump 110 through a high pressure inlet line 112 at inlet connections 113, 114 and 115. Fluid from the hydraulic amplifier 100 is returned to an intake 116 of the pump 110 through a return line 117 connected at drain connections 118, 119, 120 and 121 on the hydraulic amplifier 100. The hydraulic ram 122 is connected to the hydraulic amplifier 100 at output connections 123 and 124.

The hydraulic amplifier 100 may be controlled electrically by an electrical instrument, such as an electrodynamic input driver 101 connected directly at one end of the hydraulic amplifier 100 to a control rod 102. The control rod 102 is connected to a first pilot spool 103. A drive linkage means 104, shown by dash lines, is also connected to the driver 101 for displacing the first pilot spool 103 and a second pilot spool 103a in a straight line motion simultaneously in the same direction to derive a push-pull action on the first and second pilot spools 103 and 103a.

The electrodynamic driver 101 may be of the type which includes an armature and a set of two coils, not shown, having terminals 106, 107 and 108, terminal 107 being common to both coils. When the current in one coil is substantially equal to the current in the other coil, the armature is in a neutral or rest position. When the current in the two coils becomes unequal, the armature and the control rod 102 are caused to be moved in a predetermined direction dependent upon the direction of current unbalance that occurs. The movement of the armature and control rod 102 which is coupled to the linkage means 104 causes the first and second pilot spools 103 and 103a to move in a straight line motion in one or the other direction within first and second channels 126 and 126a respectively of the hydraulic amplifier 100. The electrodynamic driver 101 may be any one of the well known drivers which applies an input motion to the first and second pilot spools 103, 103a and forms no part of this invention.

The hydraulic amplifier 100 comprises first and second similar stages 105 and 105a connected to flanges 109, 109a on opposite ends of a valve body member 131. The valve body member 131 includes chambers 132, 133, 134, 135 and 136, separated by stator port structures 137, 138, 139 and 140, respectively. The intermediate spool 142 includes lands 143, 144, 145 and 146 coacting with the stator port structure 137, 138, 139 and 140 respectively for selectively distributing high pressure fluid under the control of the electrodynamic driver 101 to one or the other of the output connections 123 and 124 and channeling the return of exhaust fluid from one or the other of the output connections 123 and 124 to the pump 110. The stator port structure 139 and the land 145 define an orifice 147 for controlling the flow of high pressure fluid to the chamber 135 and output connection 124. The stator port structure 138, land 144 define an orifice 148 for controlling the flow of high pressure fluid to the chamber 133 and the output connection 123. Fluid may be returned to the pump 110 through chambers 132 and 133 by way of an orifice 149 defined by the land 143 and the stator port structure 137. Fluid may also be returned to the pump 110 from the output connection through chambers 135 and 136 by way of an orifice 151 defined by land 146 and stator port structure 140.

The hydraulic ram 122 includes a housing 160, having a cylindrical bore 161 adapted to slidably receive a ram piston 162. The ram piston 162 divides the cylindrical bore 161 into two chambers 163 and 164 which are connected to output connections 123 and 124 respectively. The ram piston 162 moves when an unbalanced pressure condition exists within the chambers 163 and 164. The ram piston 162 includes piston rods 165 and 166 to operate a device not shown.

The first and second stages 105 and 105a of the hydraulic amplifier 100 are the push-pull stages and may be mounted interchangeably on the mounting flanges 109 and 109a of the valve body member 131. The first and second stages 105 and 105a may also be considered as the right and left pilot valves respectively. The first and second stages 105, 105a are similar and are therefore similarly referenced by the same reference numerals except that the second stage 105a will have the small letter (a) following the reference numerals of the second stage 105a so as to distinguish between the first and second stages 105 and 105a respectively.

The first and second stages 105, 105a each include a housing 170 and 170a respectively having flanges 171 and 171a fixed to the valve body member 131 as by bolts, not shown. The first and second stages 105 and 105a are coaxially aligned with the valve body member 131 by such means as alignment members 172 and 172a fitted into concentric bores 173 and 173a on the valve body member 131. The housings 170 and 170a include coaxial cylindrical bores 174 and 174a adapted to slidably receive piston-like ends 175 and 175a of the intermediate spool 142 to define chambers 176 and 176a within the housings 170 and 170a of the first and second stages 105, 105a. The intermediate spool 142 may be displaced when a pressure differential exists between the chambers 176 and 176a. The intermediate spool 142 may be displaced to the right or to the left to vary the flow area of the orifices 147, 148, 149 and 151. The intermediate spool 142 may be at rest at various displacements when the pressure in the chamber 176 of the first stage 105 is equal to the pressure in the chamber 176a of the right or second stage 105a.

Figure 5:
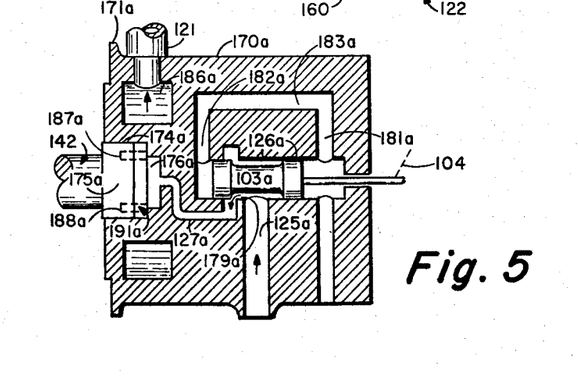
FIG. 5 is a fragmentary view showing the first stage of the hydraulic amplifier of FIG. 4.

The pressures in the chambers 176 and 176a of the first and second stages 105 and 105a are controlled by the first and second stages 105 and 105a in response to the input motion delivered to the linkage means 104 and control rod 102. Since the first and second stages 105 and 105a are similar, the second stage 105a will be described with the help of FIGS. 5–7 and it should be understood the elements or parts of the first stage 105 correspond thereto. In FIG. 5 the second stage 105a is shown in cross section and slightly enlarged to show details of the invention. The right or second stage 105a includes the housing 170a having the channel 126a, the second pilot spool 103a, slidably disposed in the channel 126a, and the piston-like end 175a slidably disposed in the cylindrical bore 174a. The channel 126a has an inlet port 125a which is in communication with the high pressure inlet line 112. The channel 126a also includes a circular porting structure 178a, similar to the circular porting structure 22 of the hydraulic amplifier 10 of FIG. 1. The second pilot spool 103a coacts with the circular porting structure 178a to define a circular orifice 179a which is also like the circular orifice 28 of the hydraulic amplifier 10 of FIG. 1. It should be noted that although a circular orifice 179a is shown, other types of orifices having substantially the same characteristics may be used. For example, the orifice may have a rectangular configuration. That is, the porting structure 178 and the spool 103a may have a rectangular cross section so that the perimeter of the orifice would correspond to the circumference of the circular orifice 179a.

Balancing ports 181a and 182a, interconnected by a passage 183a are provided in channel 126a, which balancing ports 181a and 182a are spaced from opposite ends 184a and 185a of the second pilot spool 103a, respectively, for equalizing fluid or air pressure which may occur on the opposite ends 184a at 185a of the second pilot spool 103a.

Figure 7:
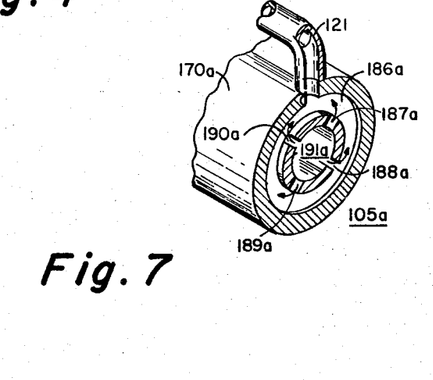
FIG. 7 is a view like FIG. 6, but in perspective, and showing a cross section taken along the line 7—7 of FIG. 4 to show details of the hydraulic amplifier of FIG. 4.

The housing 170a includes a fluid passage 127a connected between the circular orifice 179a and the chamber 176a. The housing 170a also includes an annular chamber 186a encircling the cylindrical bore 174a and communicating with the return line 117 through the drain connection 118. The cylindrical bore 174a includes a plurality of slots 187, 188, 189, 190, each having a given width. FIGS. 6 and 7 show the four slots 187a, 188a, 186a and 190a, communicating with the annular chamber 186a and the cylindrical bore 191a. The piston-like end 175a of the intermediate spool 142 coacts with the four slots 187a, 188a, 189a and 190a to define a multi-slotted orifice 191a which is like the slotted orifice 39 of the hydraulic amplifier 10 of FIG. 1 except, of course, a plurality of slots are used instead of only one slot. As was mentioned previously, the plurality of slots, namely the evenly spaced slots, 187a, 188a, 189a and 190a center the piston-like end 175a within the cylindrical bore 174a.

In accordance with the invention, the combined width of the slots 186a, 187a, 188a and 189a is less than the circumference of the circular orifice 179. Thus, if a corresponding ratio were to be maintained as the ratio in the hydraulic amplifier 10, the width of each slot 187a, 188a, 189a, and 190a would be less than the width (w) of the slotted orifice 39 but the combined width of the slots 187a, 188a, 189a and 190a would be the same. Of course, other ratios may be selected to derive a smaller or greater amplification factor in accordance with the invention as was described previously.

The hydraulic circuit of the second stage 105a may be traced from the pump 110 to the high pressure line 112 to an inlet port 125a of the channel 126a. From the channel 126a the hydraulic circuit may be traced through the circular orifice 179a to the fluid passage 127a interconnecting the chamber 176a thereto. From the chamber 176a the hydraulic circuit may be traced through the multi-slotted orifice 191a to the annular chamber 186a and then through the drain connection 121 to the return line 117 and back to the intake 116 of the pump 110. It should be noted that fluid is continually flowing through the hydraulic circuit of the second stage even when the intermediate spool 142 is at rest.

The hydraulic circuit of the first stage 105 is similar to the hydraulic circuit of the second stage and will be traced so as to show the reference numerals which correspond to the first stage 105. The hydraulic circuit may be traced from the high pressure line 112 to the input port 125 of the channel 126. From the channel 126, the hydraulic circuit may be traced through the circular orifice 179 to the fluid passage 127 interconnecting the chamber 176 thereto. From the chamber 176 the hydraulic circuit may be traced through the multi-slotted orifice 191 to the annular chamber 186 and then through the drain connector 118 to the return line 117 and back to the intake 116 of the pump 110. Fluid continually flows through the hydraulic circuit of the first stage 105, as in the second stage 105a even when the intermediate spool 142 is at rest.

In the operation of the hydraulic amplifier 100, the intermediate spool 142 may be placed at a zero reference point at which the orifices 147, 148, 149 and 151 are closed and substantially no fluid flows through the outlets 123 and 124. The ram piston 162 may also be at a zero reference position somewhere along the longitudinal axis of the ram housing 160 of the hydraulic ram 122. As was mentioned previously, the intermediate spool 142 may be in a rest position, including the zero reference position along the longitudinal axis of the valve body member 131 as long as the fluid pressure in the chamber 176 of the first stage 105 equals the fluid pressure in the chamber 176a of the second stage 105. Thus as long as the fluid pressures in the chambers 176 and 176a in the first and second stages 105 and 105a respectively are equal, the intermediate spool may be at various displacement along the longitudinal axis of the valve body member 131 and various fluid pressure settings may be established in the output connections 123 and 124 to control the movement or displacement of the ram piston 162.

In accordance with the invention, the first and second stages 105, 105a operate in substantially the same manner as the hydraulic amplifier 10 of FIG. 1 except that the intermediate spool 142 is urged in a push-pull manner to various positions by the first and second stages 105 and 105a.

The pressure in the chamber 176 and 176a of the first and second stages 105 and 105a respectively may be equalized by initially setting the flow area of the circular orifice 179 to substantially equal the flow area of the multi-slotted orifice 191 in the first stage 105 and initially setting the flow area of the circular orifice 179a to substantially equal the flow area of the multi-slotted orifice 191a. As will be recalled from the operation of the hydraulic amplifier 10 of FIG. 1, a reference pressure of approximately half supply pressure $P_{s/2}$ may be established in the chamber 176 when the flow areas of the circular orifice 179 equals the flow area of the multi-slotted orifice 191 of the first stage 105. This relationship of orifice areas is also true for the second stage 105a. It should also be remembered that the circumference of the circular orifice 179 is greater than the combined width of the slots 187, 188, 189 and 190 of the multi-slotted orifice 191. This ratio of orifice widths is the amplification ratio as previously mentioned.

The input driver 101 may, in response to a signal at terminals 106, 107, 108, displace the first and second pilot spools 103 and 103a in the same direction so that the flow area of the circular orifice 179 may, for example, be increased while the flow area of the circular orifice 179a may be decreased selectively. When the flow area of the circular orifice 179 is increased, the pressure in the chamber 176 tends to increase. At the same time, the pressure in the chamber 176a is decreased because the flow area of the circular orifice 179 is decreased. In response to the pressure changes in chambers 176 and 176a the intermediate spool 142 moves to the right or towards the second stage 105a. As the intermediate spool 142 is moved to the right the flow area of the multi-slotted orifice 191 is increased while the flow area of the multi-slotted orifice 191a of the second stage is decreased. As the flow area of the multi-slotted orifice 191 is increasing, the pressure in the chamber 176 is decreasing. In a reverse manner, as the flow area of the multi-slotted orifice 191a of the second stage 105a is decreasing the pressure in the chamber 176a is increasing. The intermediate spool 142 will continue to move to the right until the pressure in the chamber 176 of the first stage 105 equals the pressure in the chamber 176a of the second stage 105a at which time the intermediate spool 142 will come to a rest position. The pressure in the chamber 176 of the first stage 105 will equal the pressure in the chamber 176a of the second stage 105a because of a half supply pressure $P_{s/2}$ or reference pressure will be established in the chambers 176 and 176a since the flow area of the circular orifice 179 will substantially equal the flow area of the multi-slotted orifice 191 in the first stage and the flow area of the circular orifice 179a will substantially equal the flow area of the multi-slotted orifice 191a of the second stage. The intermediate spool 142 will, of course, be displaced a greater amount than the first and second pilot spools 103 and 103a by a factor as determined by the amplification ratio, as explained for the hydraulic amplifier 10 of FIG. 1.

The above operation for the hydraulic amplifier 100 is repeatable in both directions, that is, the first and second pilot spool 103 and 103a may be moved to the right or left of a neutral position to actuate the intermediate spool 142 and thus move the ram piston 162 through two levels of amplification, the first level being achieved by the first and second stages 105 and and 105a and the second level being achieved by the intermediate spool 142 co-acting with the stator port structures 137, 138, 139 and 140.

Figures 8, 9:
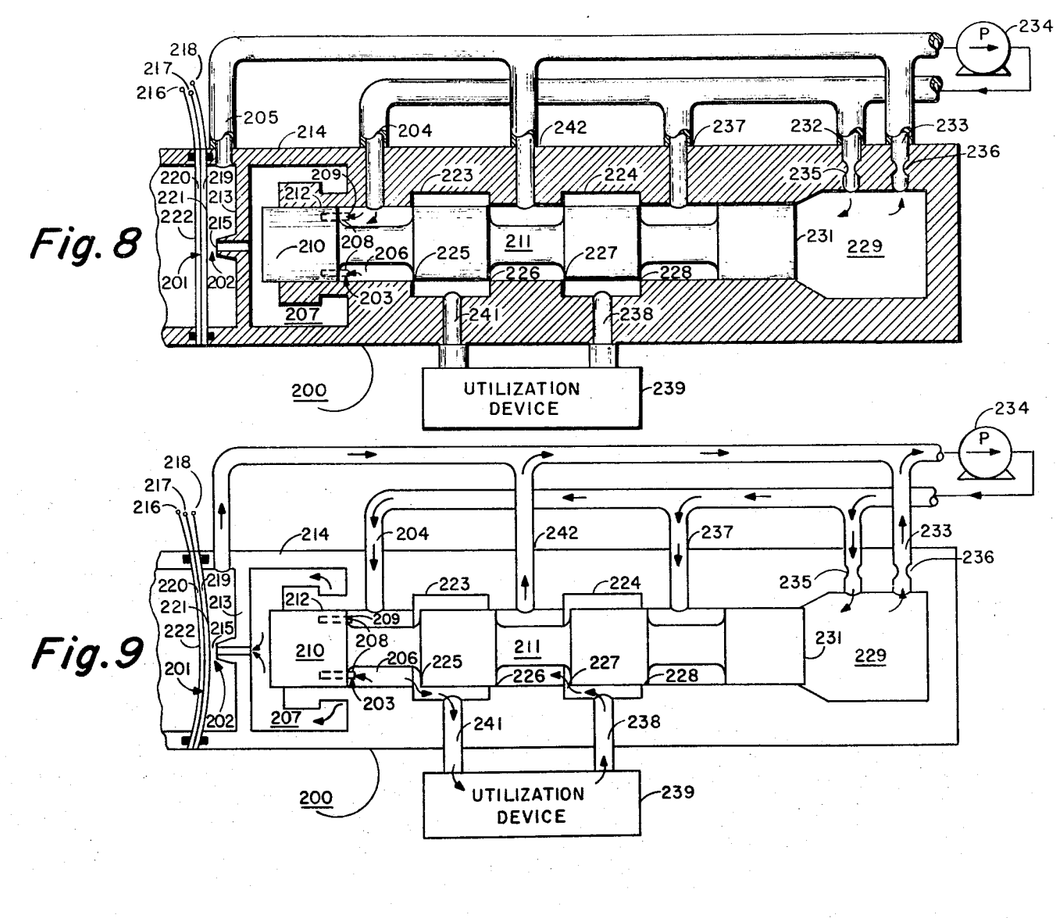
FIG. 8 illustrates another embodiment of a hydraulic amplifier in accordance with the invention in cross-sectional view.
FIG. 9 is a schematic view of the embodiment of FIG. 8 at one stage of its operation.

FIG. 8 shows another embodiment of the invention in an hydraulic amplifier 200 which features a multi-slotted orifice 203 and a circular orifice 202 controlled by a signal responsive piezoelectric driver 201. The hydraulic amplifier 200 differs from the hydraulic amplifiers 10 and 100 of FIGS. 1 and 4 respectively in that the multi-slotted orifice 202 is connected ahead of the circular orifice 203 to derive hydraulic amplification. Stated in another way, in the hydraulic amplifier 10, the circular orifice 28 is upstream relative to the slotted orifice 39, while in the hydraulic amplifier 200 the multi-slotted orifice 203 is upstream relative to the circular orifice 202. The multi-slotted orifice 203 and the circular orifice 202 are connected in series between a high pressure line 204 and an exhaust or return line 205 so that the same quantity of fluid flows through the multi-slotted orifice 203 and the circular orifice 202.

The principal hydraulic circuit of the hydraulic amplifier 200 includes the high pressure line 204, a channel 206, the multi-slotted orifice 203, a chamber 207, the circular orifice 202 and the return line 205.

The chamber 207 is interposed between the multi-slotted orifice 203 and the circular orifice 202. The fluid pressure in the chamber 207 is a function of the flow area of the multi-slotted orifice 203 and the circular orifice 202. It should be remembered that a reference pressure or half supply pressure $P_{s/2}$ may be established in the chamber 207 as long as the flow area of the multi-slotted orifice 203 and circular orifice 202 are equal. Pressure variations may be affected in the chamber 207 by the piezoelectric driver 201 which varies the length of the circular orifice 202 and thus the flow area of the circular orifice 202.

The multi-slotted orifice 203 comprises a series of slots, two of which are shown in 208 and one end 210 of a spool 211 slidably disposed in a cylindrical bore 212 of the housing 214. The multi-slotted orifice 203 has a flow area which is determined by the width of all slots 208 and by a rim 213 on the one end 210 of the spool 211 and one edge 209 of the slot 208, since all the slots 208 are aligned radially from an imaginary circle. The length of the slot 208 is slightly greater than the desired travel of the spool 211. The multi-slotted orifice 203 also affects the pressure within the chamber 207 when its flow area is varied by the displacement of the spool 211. For example, if the flow area of the multi-slotted orifice 203 is decreased, the pressure within the chamber 207 is also decreased, and when the flow area of the multi-slotted orifice 203 is increased, the pressure within the chamber 207 is also increased.

The circular orifice 202 comprises a stator port structure 213 within the housing 214 of the hydraulic amplifier 200. The stator port structure 213 includes a circular port 215 coacting with the piezoelectric driver 201. The piezoelectric driver 201 is spaced from thte circular port 215 and may be flexed towards or away from the circular port 215 in response to an electrical signal applied to terminals 216, 217, and 218. The flow area of the circular orifice 202 is determined by the diameter of the port 215 and the space between the piezoelectric driver 201 and the port 215. The spacing between the driver 201 and the port 215 is, of course, variable and dependent upon the flexure of the piezoelectric driver 201.

The piezoelectric driver comprises two laminated piezoelectric elements or disks 219 and 220, which are bonded together on one face thereof and are polarized normal to outer faces 221 and 222 respectively thereon. The bonded faces include an electrode therebetween, connected to lead 217. The other two outer faces 221 and 222 of the piezoelectric disks 219, 220 include an electrode connected to leads 218 and 216 respectively. The piezoelectric driver 201 may be driven at various frequencies by an electrical input signal applied to terminals 216, 217, and 218 in a manner well known to those skilled in the art to derive a flexural mode of vibration. The piezoelectric driver 201 may, of course, be flexed by a DC signal when a steady state condition is required.

The hydraulic amplifier 200 further includes the housing 214, having a cylindrical bore 212, The cylindrical bore 212 includes two porting structures 223 and 224 which coact with the spool 212 to define orifices 225, 226, 227 and 228. The cylindrical bore 212 terminates into a relatively large chamber 229, which is partially bounded by one end 231 of the spool 211. An inlet line 232 and a return line 233 are connected to the chamber 229. Inlet line 232 is a high pressure line which is connected to the pump 234 for the flow of high pressure fluid therethrough. Return line 233 is connected to return line 205 for providing a return path for the fluid from the chamber 229 to the pump 234. The inlet line 232 and the return line 233 each include a restriction 235 and 236 respectively of equal area for establishing a reference pressure or half supply pressure $P_{s/2}$ within the chamber 229 as previously described for the hydraulic amplifier 10.

The hydraulic amplifier 200 includes an inlet connection at 237 for the flow of fluid from the pump 234 through the orifice 228 to an outlet line 238 to a utilization device 239. The hydraulic amplifier 200 further includes an outlet line 241 connected between the utilization device 239 and the orifice 225. Fluid from the utilization device 239 may be returned to the pump 234 through the orifice 226 or orifice 227 to a return line 242.

The operation of the hydraulic amplifier 200 will be described with the help of FIG. 9, which shows the hydraulic amplifier 200 in one stage of operation. FIG. 8, however, shows the spool in a rest position such that the orifices 225, 226, 227 and 228 are closed. In FIG. 9 the piezoelectric driver 201 is flexed towards the port 215 to decrease the flow area of the circular orifice 202 in response to an electric signal applied to terminals 216, 217 and 218. High pressure fluid normally flows from the pump 234 to the high pressure line 204 through the channel 206 and through the multi-slotted orifice 203 to the chamber 207. From the chamber 207, the fluid flows through the port 215 to the return line 205 and back to the pump 234. When the spool 211 is in a rest position, the pressure in the chamber 207 equals the pressure in the chamber 229, or approximately one half supply pressure. In order for a half supply pressure to exist in the chamber 207 the flow area of the multi-slotted orifice 203 must substantially equal the flow area of the circular orifice 202. Referring back to FIG. 9, since the piezoelectric driver 201 has been flexed towards the port 215 in response to an electrical signal, the flow area of the circular orifice 202 has been made smaller. As a consequence to this decrease of flow area of the circular orifice 202, the pressure within the chamber 207 has been increased by an amount proportional to the closure of the circular orifice 202. As the pressure in the chamber 207 increases the spool 211 is displaced towards the right or towards the chamber 229. As the spool 211 moves to the right, the flow area of the multi-slotted orifice decreases and causes the pressure within the chamber 207 to decrease by an amount proportional to the incremental change in the flow area of the multi-slotted orifice 203. The spool 211 will continue to move to the right until the pressure in the chamber 207 has once again dropped to the half supply pressure $P_{s/2}$. When the pressure in the chamber 207 has dropped to one half supply pressure $P_{s/2}$ the flow area of the multi-slotted orifice 203 will equal the flow area of the circular orifice 202 for the reasons given previously in the description of the hydraulic amplifier 10 in FIG. 1. The spool 211 is displaced a greater amount than the flexure of the piezoelectric driver 201. The amount of the displacement of the spool 211 is dependent upon the ratio of the circumference of the circular orifice 202 to the combined widths of the slots 208 in the multi-slotted orifice 203 as previously described.

Fluid from the pumps 234 is channeled to the utilization device 239 through the orifice 225 to output line 241, connected to the utilization device 239. Fluid from the utilization device 239 is returned to the pump through a line 238 through orifice 227 and to return line 242 connected to the pump 234.

The above operation described for the hydraulic amplifier 200 may be repeated in various degrees to displace the spool 211 at various rest positions or the spool 211 may be driven in the opposite direction by flexing the piezoelectric driver in the opposite direction in response to an electrical signal of opposite polarity to the signal which was first applied to the input leads 216, 217 and 218. The hydraulic amplifier may be operated in the audio frequency range to control a hydroacoustic transducer which may be used for underwater communication, thus the utilization device 239 may be a hydroacoustic transducer, a hydraulic ram or other such devices which depend upon fluid pressure for their operation.

While specific embodiments of the invention have been shown, still further modifications may readily occur to those skilled in the art. Accordingly the foregoing description should be taken as illustrative and not in a limiting sense.

What is claimed is:

1. A hydraulic amplifier comprising:
   (a) a housing,
   (b) a first valving means within said housing,
   (c) a second valving means within said housing connected to said first valving means for the flow of fluid under pressure therethrough,
   (d) said first valving means including a first orifice whose flow area is determined by a fixed perimeter and a given length which may be varied by an applied input motion thereto,
   (e) said second valving means including a second orifice whose flow area is determined by a longitudinal slot having a given width and a pressure responsive means movable along the length of said slot,
   (f) said perimeter of said first orifice being greater than said width of said longitudinal slot in at least a ratio greater than one,
   (g) biasing means for biasing said pressure responsive means to a rest position when said area of said first orifice equals said area of said second orifice, and (h) coupling means coupled to said pressure responsive means for coupling movement of said pressure responsive means to a load.

2. A hydraulic amplifier comprising:
(a) a housing,
(b) a first valving means within said housing,
(c) a second valving means within said housing connected to said valving means for the flow of fluid under pressure therethrough,
(d) said first valving means including a circular orifice whose flow area is determined by its circumference and a length which may be varied by an applied input motion thereto,
(e) means for applying said input motion to said first valving means,
(f) said second valving means including a slotted orifice whose flow area is determined by a longitudinal slot having a fixed width and a piston slidably disposed along the length of said slot,
(g) biasing means for biasing said pressure responsive means to a rest position when said area of said circular orifice substantially equals said slotted orifice, and
(h) coupling means coupled to said piston for transferring said motion of said piston to a load.

3. A hydraulic amplifier comprising:
(a) a housing having a cylindrical bore,
(b) said housing including an inlet and a longitudinal slot of a given width disposed along a longitudinal axis of said cylindrical bore, for the flow of a fluid under pressure therethrough,
(c) an intermediate spool slidably disposed in said cylindrical bore and partially covering said longitudinal slot to define a slotted orifice,
(d) a fluid passage communicating with said cylindrical bore of said housing for the flow of high pressure fluid therethrough,
(e) valving means having a circular orifice of a fixed circumference connected to said fluid passage for selectively varying said pressure of said fluid within said passage in response to an applied input motion along the axis of said circular orifice,
(f) said circumference of said circular orifice being greater than said width of said slotted orifice in at least a ratio greater than one, and
(g) means for yieldingly biasing said intermediate spool along the longitudinal axis of said slot to a rest position when the flow area of said slotted orifice substantially equals the flow area of said circular orifice.

4. A hydraulic amplifier of the type having a spool for controlling the flow of a high pressure fluid into and out of a utilization device, comprising:
(a) a housing having a cylindrical bore adapted to receive one end of said spool,
(b) said housing including an inlet and at least one longitudinal slot disposed along a longitudinal axis of said cylindrical bore,
(c) said one end of said spool being slidably disposed within said cylindrical bore and partially covering said slot to define a slotted orifice,
(d) a valving means having a given orifice whose flow area is defined by a given perimeter and a length which may be varied normal to said perimeter in response to an applied input motion thereto,
(e) a single fluid passage connecting said slotted orifice and said given orifice so that the same quantity of fluid passes through said slotted orifice and said given orifice, whereby a given reference pressure exists in said cylinder when said flow area of said slotted orifice substantially equals said flow area of said given orifice,
(f) said perimeter of said given orifice being greater than said width of said slotted orifice in at least a ratio greater than one, and
(g) means coupled to the other end of said spool for yieldingly biasing said spool in a rest position when said given reference pressure exists in said bore.

5. A hydraulic amplifier comprising:
(a) a housing having a longitudinal chamber,
(b) said chamber including an inlet and a longitudinal slot of a given width disposed along a longitudinal axis of said chamber for the flow of a fluid therethrough,
(c) an intermediate spool slidably disposed in said cylindrical bore and partially covering said elongated slot to define a slotted orifice within said chamber,
(d) valving means having a pilot spool controlling a circular orifice whose flow area is determined by a fixed circumference and a displacement of said pilot spool for selectively varying said pressure within said chamber in response to an applied input motion to said pilot spool,
(e) said circumference of said circular orifice being greater than said width of said slotted orifice in at least a ratio greater than one, and
(f) means for yieldingly biasing said intermediate spool along the longitudinal axis of said slot to a rest position when the flow area of said slotted orifice substantially equals the flow area of said circular orifice.

6. A hydraulic amplifier of the type having a spool for controlling the flow of a high pressure fluid into and out of a utilization device, comprising:
(a) a housing having a cylindrical bore adapted to receive one end of said spool to define a chamber,
(b) said housing including an inlet and a plurality of longitudinal slots within said chamber and disposed along a longitudinal axis of said cylindrical bore,
(c) said one end of said spool being slidably disposed within said cylindrical bore and partially covering said longitudinal slots to define a multi-slotted orifice,
(d) a valving means having a given circular orifice having a flow area defined by a given perimeter and a length which may be varied normal to said perimeter in response to an applied input motion thereto,
(e) a single fluid passage connecting said slotted orifice and said circular orifice so that the same quantity of fluid passes through said multi-slotted orifice and said circular orifice, whereby a given reference pressure exists in said chamber when the flow area of said multi-slotted orifice substantially equals said area of said circular orifice,
(f) said perimeter of said given orifice being greater than the combined widths of said multi-slotted orifice in at least a ratio greater than one, and
(g) means coupled to the other end of said spool for yieldingly biasing said spool in a rest position when said given reference pressure exists in said bore.

References Cited

UNITED STATES PATENTS

| | | | |
|---|---|---|---|
| 2,625,136 | 1/1953 | Moog | 137—625.61 |
| 2,931,343 | 4/1960 | Moog | 137—625.62 |
| 2,962,002 | 11/1960 | Hayner | 137—625.64 |
| 3,101,650 | 8/1963 | Blanton | 137—625.64 |
| 3,219,060 | 11/1965 | Pearl et al. | 137—625.6 |

M. CARY NELSON, *Primary Examiner.*

R. J. MILLER, *Assistant Examiner.*